United States Patent
Nakamura

(10) Patent No.: US 10,857,710 B2
(45) Date of Patent: Dec. 8, 2020

(54) MOLD CONVEYING GUIDE DEVICE AND INJECTION MOLDING MACHINE

(71) Applicant: Nichietsu Inc., Yokohama (JP)

(72) Inventor: Takashi Nakamura, Kanagawa (JP)

(73) Assignee: Nichietsu Inc., Yokohama (JP)

( * ) Notice: Subject to any disclaimer, the term of this patent is extended or adjusted under 35 U.S.C. 154(b) by 0 days.

(21) Appl. No.: 16/697,314

(22) Filed: Nov. 27, 2019

(65) Prior Publication Data
US 2020/0276742 A1 Sep. 3, 2020

(30) Foreign Application Priority Data
Mar. 1, 2019 (JP) .................... 2019-037983

(51) Int. Cl.
| B29C 45/17 | (2006.01) |
| B29C 45/33 | (2006.01) |
| B29C 45/80 | (2006.01) |
| B29C 45/66 | (2006.01) |
| B29C 45/04 | (2006.01) |
| B29C 31/00 | (2006.01) |

(52) U.S. Cl.
CPC ........ B29C 45/332 (2013.01); B29C 45/0408 (2013.01); B29C 45/0433 (2013.01); B29C 45/1742 (2013.01); B29C 45/66 (2013.01); B29C 45/80 (2013.01); B29C 31/006 (2013.01); B29C 45/1756 (2013.01); B29C 2945/76568 (2013.01)

(58) Field of Classification Search
CPC . B29C 31/006; B29C 33/305; B29C 45/0408; B29C 45/1742; B29C 45/1756
See application file for complete search history.

(56) References Cited

U.S. PATENT DOCUMENTS

| 5,350,289 | A | * | 9/1994 | Martin | .................. B29C 31/006 264/328.1 |
| 6,010,324 | A | * | 1/2000 | Oshiro | ................ B29C 45/1742 425/186 |
| 2003/0138513 | A1 | * | 7/2003 | Matsuura | ............. B22D 17/229 425/186 |
| 2006/0083803 | A1 | * | 4/2006 | DiSimone | ........... B29C 45/1756 425/190 |
| 2014/0175690 | A1 | * | 6/2014 | Sudermann | ......... B29C 45/2675 264/39 |
| 2018/0009146 | A1 | | 1/2018 | Nakamura | |

FOREIGN PATENT DOCUMENTS

| JP | 5-269804 | * 10/1993 |
| JP | H09-066543 A | 3/1997 |
| JP | 2018-001738 A | 1/2018 |

* cited by examiner

*Primary Examiner* — James P Mackey
(74) *Attorney, Agent, or Firm* — Banner & Witcoff, Ltd.

(57) ABSTRACT

There is provided a mold conveying guide device for use in replacement of a mold by conveying the mold into and out of a mold fixing position in an injection molding machine. A connecting arm is attached to the mold and projects in a direction in which the mold is conveyed into the mold fixing position. A guide roller is rotatably supported at a tip end portion of the connecting arm. The guide roller is configured to rotate while being in contact with a mold attaching surface of at least one of a fixed platen and a movable platen, and configured to guide the mold such that the mold can come close to or move away from the at least one of the fixed platen and the movable platen.

7 Claims, 14 Drawing Sheets

MOLD CONVEYING GUIDE DEVICE AND INJECTION MOLDING MACHINE

CROSS-REFERENCE TO RELATED APPLICATIONS

The disclosure of Japanese Patent Application No. 2019-037983 filed on Mar. 1, 2019, including specification, drawings and claims is incorporated herein by reference in its entirety.

TECHNICAL FIELD

The present disclosure relates to a mold conveying guide device for use in replacement of a mold in an injection molding machine, and an injection molding machine including the same.

BACKGROUND

Due to the subdivision of needs in recent years, there is a growing demand for the production of many kinds in small quantities in injection molding, and the frequency of replacement of molds used in injection molding machines tends to increase. However, since molds used in injection molding machines are heavy objects ranging from tens of kilograms to tens of tons, the operation of moving the mold when replacing the mold and the operation of fixing the mold to a predetermined position with high accuracy are burdens on operators.

In addition, in the operation of moving the mold, when the mold is brought into contact with a mold attaching surface of the injection molding machine, the friction hinders smooth alignment of the mold, and also may cause damage to the mold and the mold attaching surface.

Examples of structures for reducing the burden on the operators and preventing the damage to the mold and the mold attaching surface are disclosed in Patent Document 1 and Patent Document 2, for example.

Patent Document 1: Japanese Patent Application Publication No. H09-066543

Patent Document 2: Japanese Patent Application Publication No. 2018-001738

Patent Document 1 discloses a configuration in which a large number of rollers on which molds are placed are fixed to a mold attaching surface of an injection molding machine and a mold replacing device provided adjacent to the injection molding machine, and smooth rotation of the mold is possible by rotating the rollers. With this configuration, the mold can be easily conveyed between the mold replacing device and the injection molding machine, and the above problem of the burden on the operators is solved.

In addition, Patent Document 2 discloses a configuration in which a groove is formed in a fixed platen or a movable platen with a mold attaching surface, and the groove is installed with a roller movable between a position protruding from the mold attaching surface and a position retracted from the mold attaching surface and a resilient member configured to elastically press the roller into the protruding position. The roller protrudes from the mold attaching surface when replacing the mold to separate the mold from the mold attaching surface. In addition, when fixing the mold, the roller is pressed by the mold and pushed to the mold attaching surface to bring the mold into contact with the mold attaching surface.

In recent years, in order to further improve the productivity of molded products, demands in production processes are becoming stricter, such as increase in frequency of replacing the mold more than ever and reduction in tact time. For example, the convey-in/convey-out speed of the mold is about 300 mm/s at the maximum and the frequency of replacing the mold is about 10 times per day at the maximum in a general mold replacing device in the related art; while in some cases, the mold is conveyed in and out at a moving speed higher than 1000 mm/s, and the mold is replaced at a frequency more than 5000 times per day. Thus, when the convey-in/convey-out speed of the mold is further increased and the frequency of replacing the mold is increased, damage to the mold attaching surface of the injection molding machine and the mold cannot be ignored.

Damage to the mold attaching surface and the mold causes a failure of the injection molding machine, the mold, the mold replacing device, and the like, and deterioration of accuracy of the molded product. In addition, in order to repair a damaged fixed platen or movable platen, it is necessary to disassemble the injection molding machine and perform process with a large machine tool, which increases the repair cost and also causes a problem that production stops during the repair period.

In the injection molding machine disclosed in Patent Document 2, it is necessary to form a groove in the fixed platen or the movable platen. This groove requires a sufficient volume for installing the roller and the resilient member so as to move forward and backward.

However, when the groove is machined in the existing injection molding machine, it is necessary to disassemble the injection molding machine, so that processing is expensive and time consuming, and the production stoppage period is extended. In addition, since it is necessary for the fixed platen and the movable platen to receive the mold clamping force generated by the injection molding machine, the strength becomes insufficient when the groove is formed in the fixed platen or the movable platen of the existing injection molding machine. Therefore, there are cases where the generated mold clamping force has to be reduced.

As a method for preventing the strength of the injection molding machine from being lowered, there is a method in which a new platen is attached to the fixed platen or the movable platen, and a groove is formed in the attached platen. However, in this method, a distance between the fixed platen and the movable platen is shortened, and a maximum thickness of the mold that can be attached is reduced.

On the other hand, when a new injection molding machine is manufactured, the strength can be improved by changing the shape of the fixed platen or movable platen. At this time, when a thickness of the fixed platen or the movable platen increases, the maximum thickness of the mold can be maintained by increasing a length of a tie bar. However, such a design change may cause cost increases.

SUMMARY

It is one of objects of the present disclosure to provide a mold conveying guide device which can be installed easily at a low cost, do not cause restrictions on strength or mold dimensions of the molding machine, prevent damage to the mold and the molding machine, and realize replacement of the mold at a high speed, and to provide an injection molding machine with the mold conveying guide device.

According to aspects of the embodiments of the present disclosure, there are provided the following configurations.

(1) A mold conveying guide device for use in replacement of a mold by conveying the mold into and out of a mold fixing position in an injection molding machine which is configured to sandwich the mold conveyed into the mold fixing position between a fixed platen and a movable platen to injection-mold a molded product, the mold conveying guide device including:

a connecting arm attached to the mold and projecting in a direction in which the mold is conveyed into the mold fixing position; and a guide roller rotatably supported at a tip end portion of the connecting arm, configured to rotate while being in contact with a mold attaching surface of at least one of the fixed platen and the movable platen, and configured to guide the mold such that the mold can come close to or move away from the at least one of the fixed platen and the movable platen.

(2) An injection molding machine which is configured to sandwich a mold conveyed into a mold fixing position between a fixed platen and a movable platen to injection-mold a molded product, the injection molding machine including:

a plurality of molds;

a plurality of mold conveying guide devices each of which is the mold conveying guide device according to (1), the plurality of mold conveying guide device provided on the plurality of molds, respectively;

a mold conveying mechanism configured to convey the molds into and out of the mold fixing position; and a mold clamping mechanism configured to clamp the mold by pressing the movable platen against the fixed platen with the mold interposed therebetween.

With the above configurations, the mold can be installed easily at a low cost, restrictions on strength or mold dimensions of the molding machine are not caused, the damage to the mold or molding machine can be prevented, and the replacement of the mold can be realized at a high speed.

DETAILED DESCRIPTION OF THE EMBODIMENTS

Hereinafter, embodiments of the present disclosure will be described in detail with reference to the drawings.

First Embodiment (Configuration of Horizontal Injection Molding Machine)

First, a description will be made to a first embodiment of a mold conveying guide device for use in replacement of a mold in an injection molding machine for injection-molding a molded product.

Figure 1:
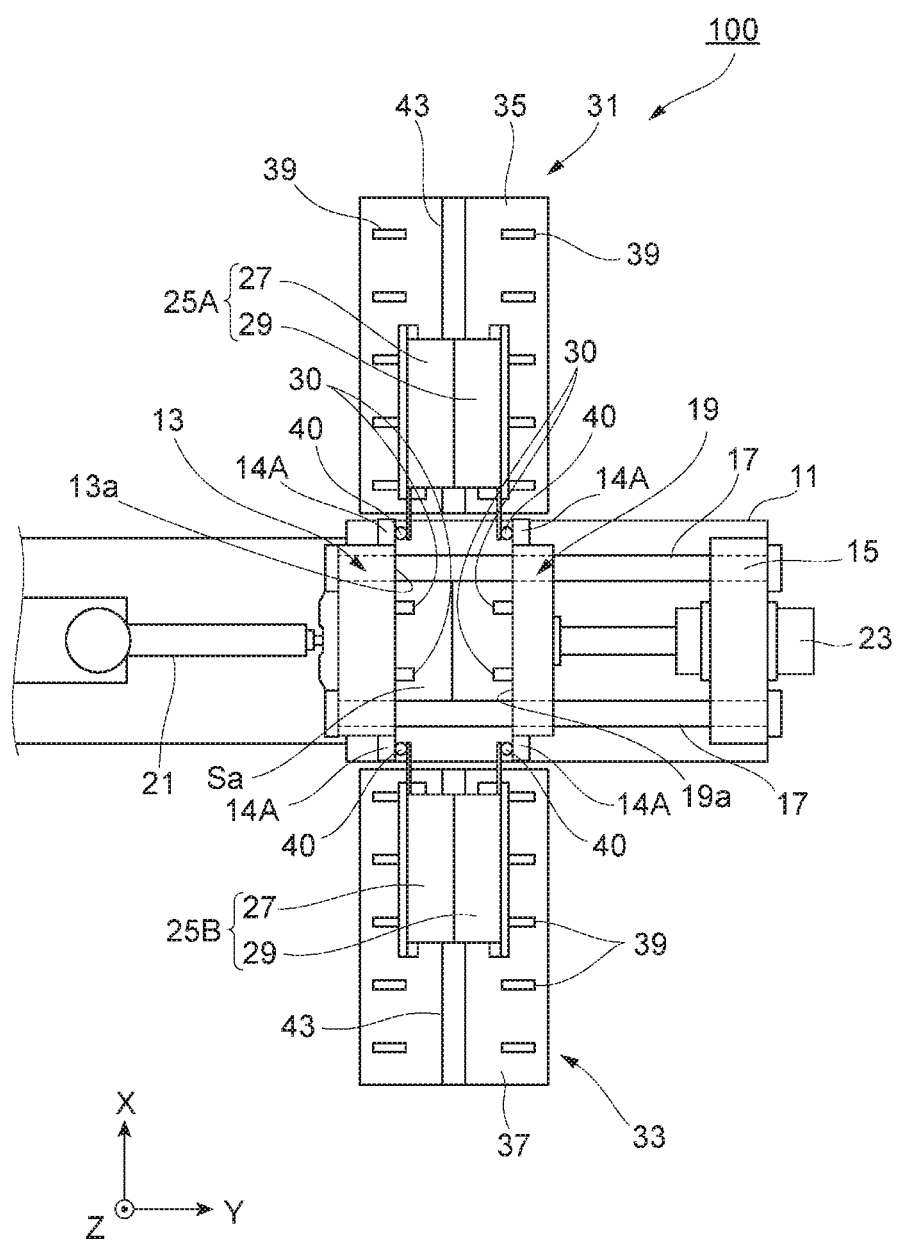
FIG. 1 is a schematic configuration diagram of a horizontal injection molding machine provided with a mold replacing device according to a first embodiment.
Figure 2:
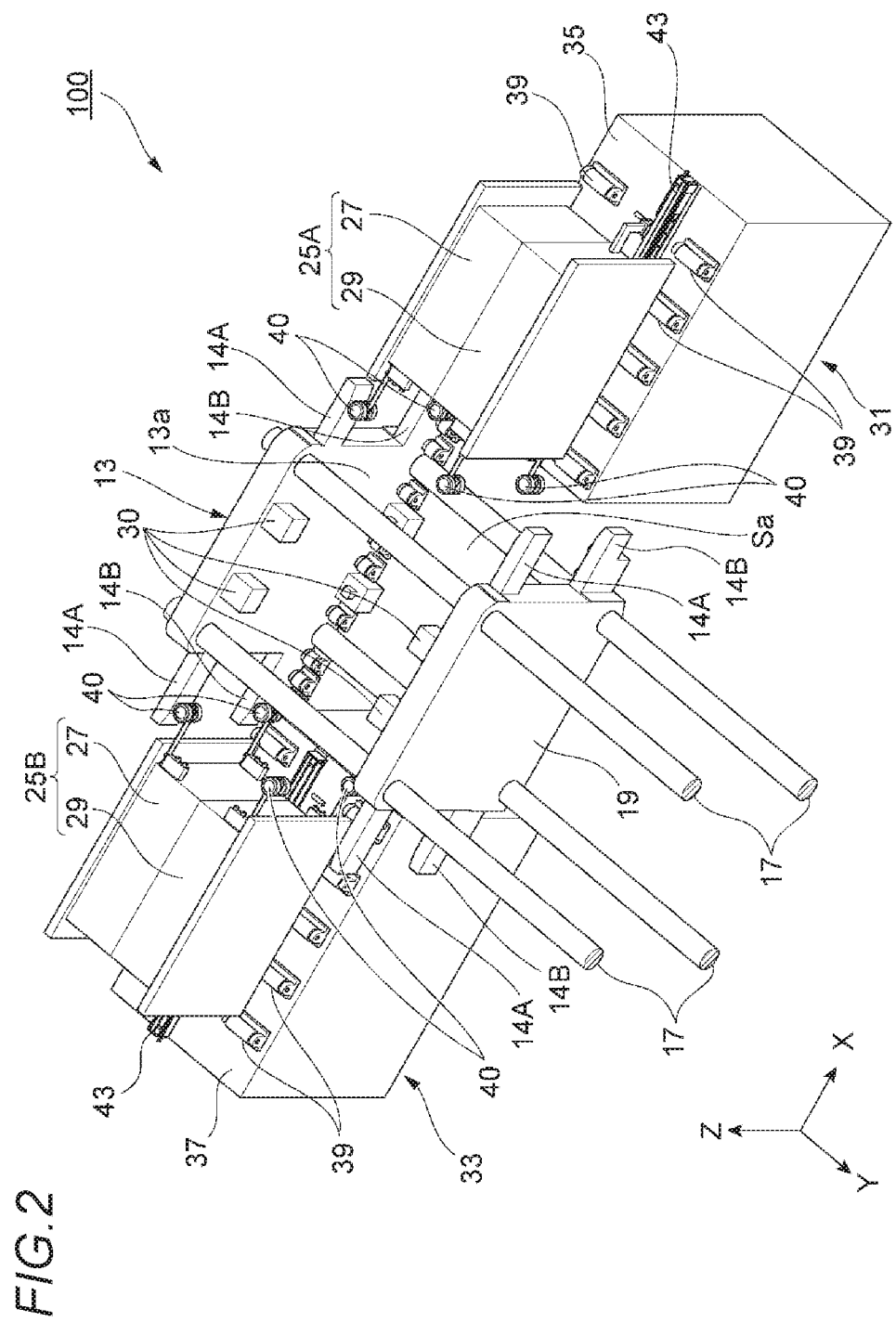
FIG. 2 is a perspective view of main parts of the horizontal injection molding machine shown in FIG. 1.

FIG. 1 is a schematic configuration diagram of a horizontal injection molding machine 100 provided with a mold replacing device. FIG. 2 is a perspective view of main parts of the horizontal injection molding machine 100 shown in FIG. 1.

The horizontal injection molding machine (hereinafter referred to as an injection molding machine) 100 shown in FIG. 1 includes a base 11, a pair of fixed platens 13 and 15, a movable platen 19 configured to move along a tie bar 17, an injection cylinder 21, and a mold clamping mechanism 23. The injection molding machine 100 also includes a first mold replacing device 31 and a second mold replacing device 33 to be described in detail later. With these, a pair of molds 25A and 25B is conveyed into and out of the molding machine.

In the following description, a mold moving direction when replacing the molds 25A and 25B is referred to as an X direction, a mold clamping direction is referred to as a Y direction, and a vertical direction is referred to as a Z direction.

The pair of fixed platens 13 and 15 in flat-plate shapes supported by the four tie bars 17 shown in FIG. 2 is fixed to the base 11. The fixed platens 13 and 15 are disposed on the base 11 with a predetermined interval and with platen surfaces parallel to each other. On both sides of the fixed platen 13 and the movable platen 19 in the X direction, a pair of upper and lower guide pieces 14A and 14B are provided to protrude along a conveying direction (X direction).

The movable platen 19 is formed in a flat plate shape, and is supported to be movable along the tie bar 17 between the pair of fixed platens 13 and 15. The movable platen 19 defines a mold fixing space Sa, in which one of the molds 25A and 25B is disposed, between the movable platen 19 and the fixed platen 13.

A mold attaching surface (surface facing the movable platen 19) 13a of the fixed platen 13 is a vertical surface orthogonal to the clamping direction. Between the mold attaching surface 13a and a mold attaching surface 19a (surface facing the fixed platen 13) of the movable platen 19, one of the molds 25A and 25B configured by a fixed mold 27 and a movable mold 29 is fixed.

Clamps 30 for detachably fixing the mold 25 are provided on the mold attaching surface 13a of the fixed platen 13. In addition, clamps 30 for detachably fixing the movable mold 29 are provided on the mold attaching surface 19a of the movable platen 19.

The injection cylinder 21 shown in FIG. 1 is provided on a fixed platen 13 side, and configured to inject a molding resin into a cavity in a fixed mold. The mold clamping mechanism 23 is attached to the fixed platen 15 and configured to press the movable platen 19 against the fixed platen 13.

On both sides of the base 11 of the injection molding machine 100 in the X direction, the first mold replacing device 31 and the second mold replacing device 33 for replacing the mold 25 are respectively disposed to face the mold fixing space Sa.

The first mold replacing device 31 includes a base 35 disposed on one side of the injection molding machine 100, and the second mold replacing device 33 includes a base 37 disposed on the other side of the injection molding machine 100. On upper surfaces of the bases 35 and 37, a large number of mold conveying rollers 39 and a conveying drive unit 43 for conveying the molds 25A and 25B are disposed.

The mold conveying rollers 39 support the molds 25A and 25B to be movable, and are disposed in two rows along a longitudinal direction (X direction) of the bases 35 and 37. The mold conveying rollers 39 are also provided below the mold attaching surfaces 13a and 19a of the fixed platen 13 and the movable platen 19 as necessary.

The conveying drive units 43 are provided on the bases 35 and 37, respectively and are configured to individually convey the molds 25A and 25B, which are placed on the mold conveying rollers 39, into the mold fixing space Sa, and to convey the mold 25 out of the mold fixing space Sa. A known drive mechanism such as a uniaxial slider can be used for the conveying drive units 43.

(Configuration of Mold Conveying Guide Device)

At least one, preferably both, of the fixed mold 27 and the movable mold 29 is provided with a mold conveying guide device 40. FIG. 1 and FIG. 2 show a configuration example in which a pair of upper and lower mold conveying guide devices 40 is provided on both the fixed mold 27 and the movable mold 29. The mold conveying guide device 40 is provided at one end (a front side) of each of the molds 25A and 25B in the conveying direction (X direction) of the molds 25A and 25B, according to heights of the guide pieces 14A and 14B provided on the fixed platen 13 and the movable platen 19. The mold 25A is placed on the first mold replacing device 31 with a side on which the mold conveying guide device 40 is provided facing the mold fixing space Sa. Similarly, the mold 25B is placed on the second mold replacing device 33 with a side on which the mold conveying guide device 40 is provided facing the mold fixing space Sa.

Figure 3:
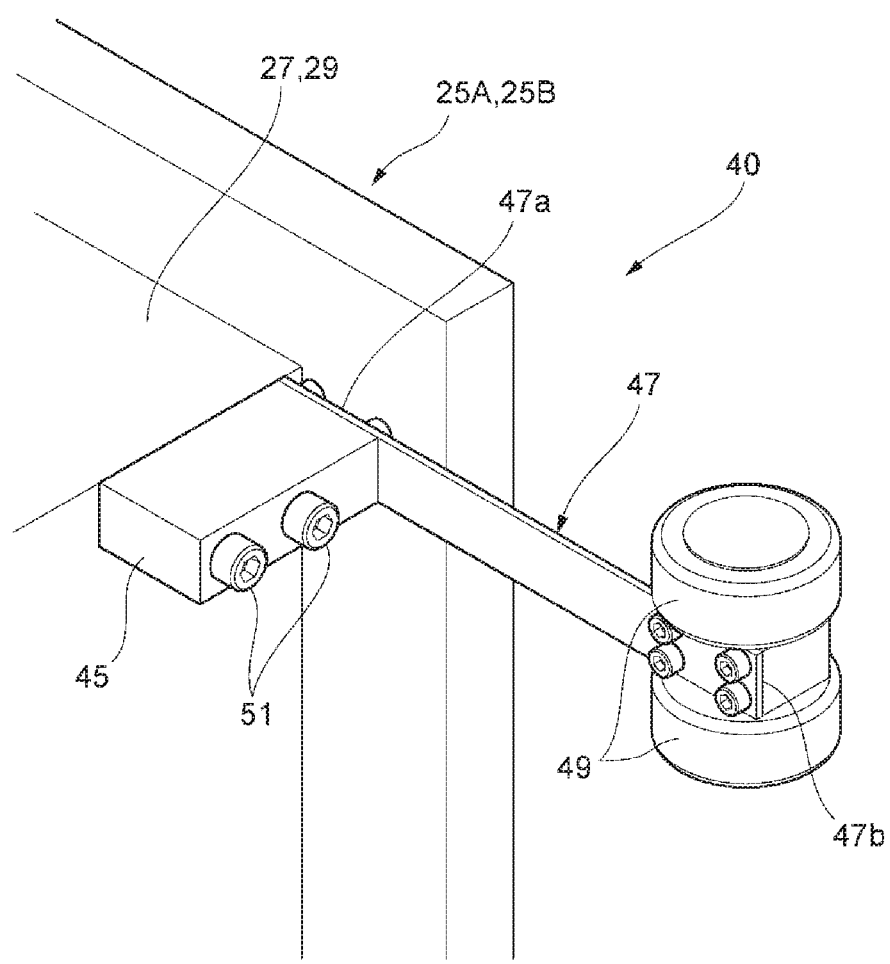
FIG. 3 is an enlarged perspective view of a mold conveying guide device.

FIG. 3 is an enlarged perspective view of the mold conveying guide device 40. The mold conveying guide device 40 includes a connecting arm 47 and a guide roller 49. The connecting arm 47 is fixed to the end portion on the front side of the molds 25A and 25B in the direction in which the mold 25 is conveyed into the mold fixing space Sa which is a mold fixing position of the molds 25A and 25B (fixed mold 27 and movable mold 29), via a fixing portion 45, and protrudes in the direction in which the mold 25 is conveyed into the mold fixing space Sa.

The fixing portion 45 is screwed by fastening screws 51 into fixing screw holes (not shown) provided in the mold 25. The means for fixing the fixing portion 45 to the mold 25 is not limited to screwing. For example, the fixing portion 45 may be fixed to the mold 25 by welding.

The connecting arm 47 is made of an elastic member such as spring steel. With the connecting arm 47 elastically deforming itself, the connecting arm 47 supports the guide roller 49 to be swingable in a horizontal direction about the fixing portion 45.

The guide roller 49 is rotatably supported by a tip end portion 47b of the connecting arm 47. In addition to the pair of upper and lower rollers illustrated in FIG. 3, the guide roller 49 may be a single roller. The guide roller 49 is made of a resin material, a metal, a rubber material, or the like.

(Mold Replacement Procedure)

Next, a mold replacement procedure in the injection molding machine 100 will be described with reference to FIG. 4A to FIG. 4D.

Figure 4A:
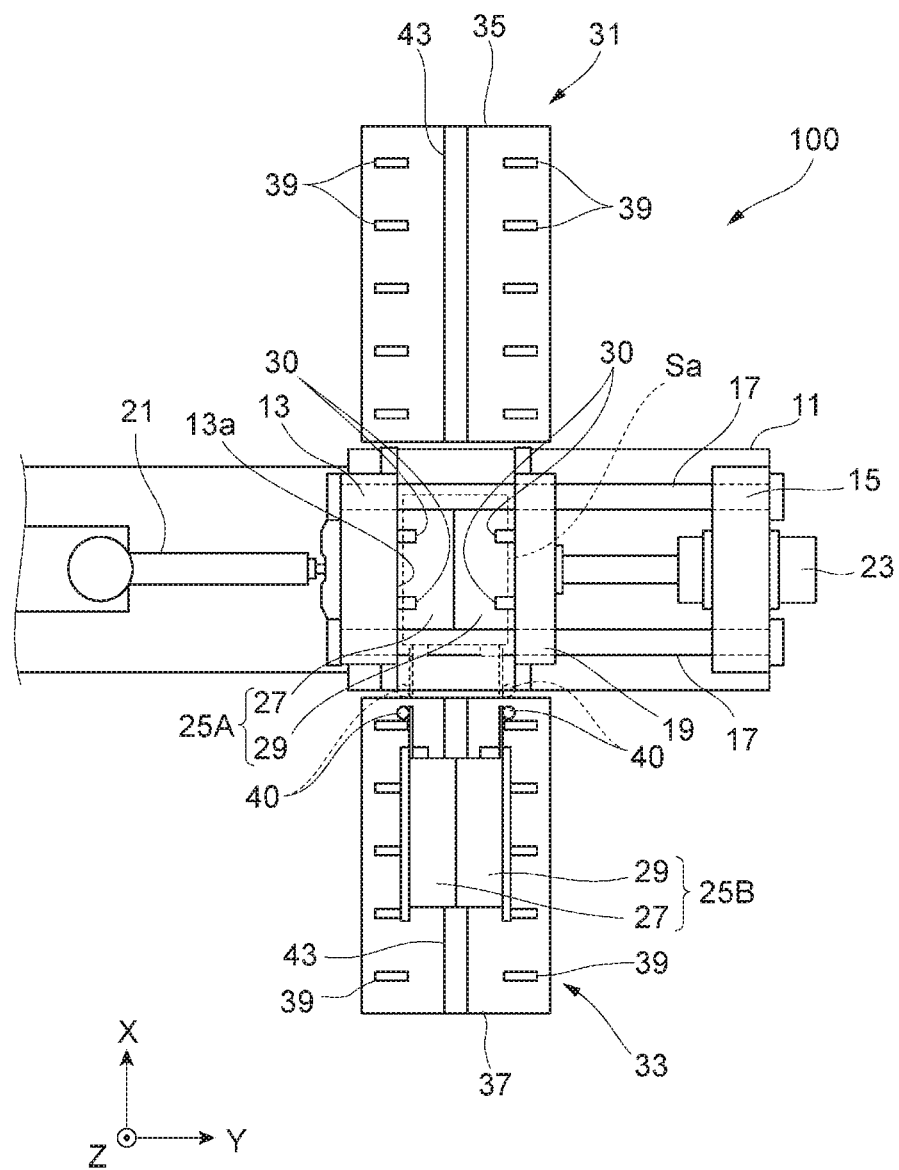
FIG. 4A is a process explanatory diagram illustrating a procedure of replacing a mold in the horizontal injection molding machine.

As shown in FIG. 4A, a state where the mold 25A is fixed to the fixed platen 13 and the movable platen 19 at the mold fixing position in the mold fixing space Sa is defined as an initial state. The mold 25A is a mold conveyed into the mold fixing space Sa from the first mold replacing device 31. The mold 25B to be conveyed into the mold fixing space Sa is placed on the second mold replacing device 33.

From this state, the mold clamping of the mold 25A by the mold clamping mechanism 23 is released, and the fixation of the fixed mold 27 and the movable mold 29 by the clamp 30 is released.

Figure 4B:
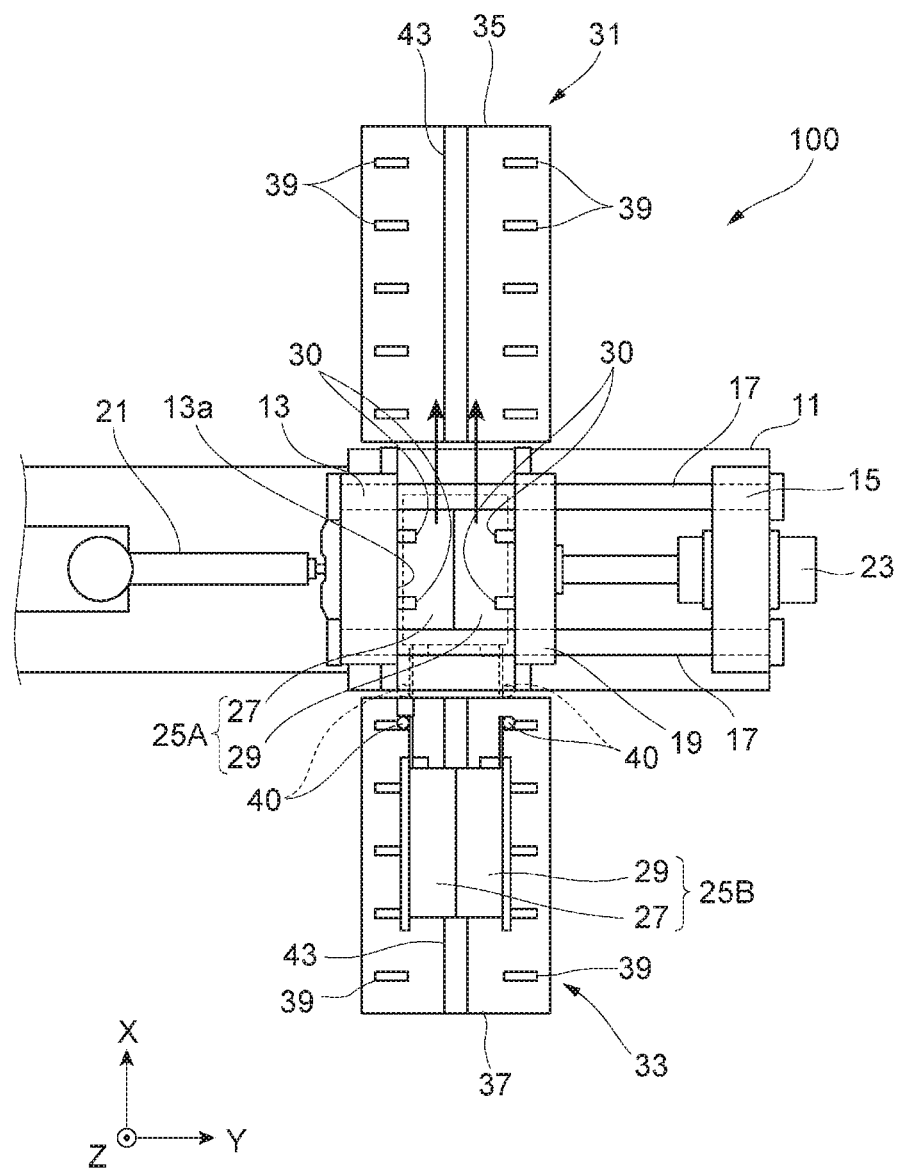
FIG. 4B is a process explanatory diagram illustrating a procedure of replacing the mold in the horizontal injection molding machine.
Figure 4C:
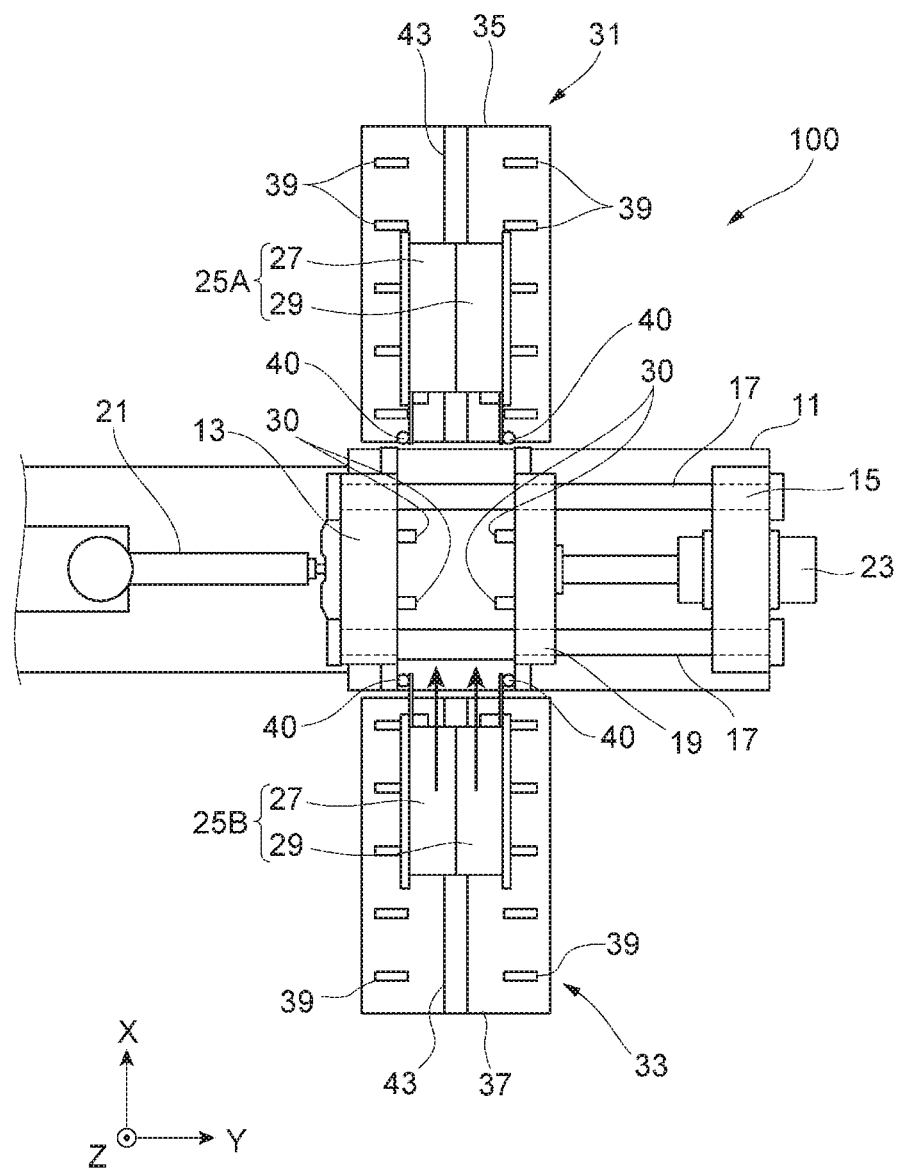
FIG. 4C is a process explanatory diagram illustrating a procedure of replacing the mold in the horizontal injection molding machine.

Next, as shown by arrows in FIG. 4B, the mold 25A is conveyed out of the mold fixing space Sa to the mold conveying rollers 39 of the first mold replacing device 31. Further, as shown in FIG. 4C, the mold 25B is conveyed into the mold fixing space Sa, which is vacant, from the second mold replacing device 33.

Figure 4D:
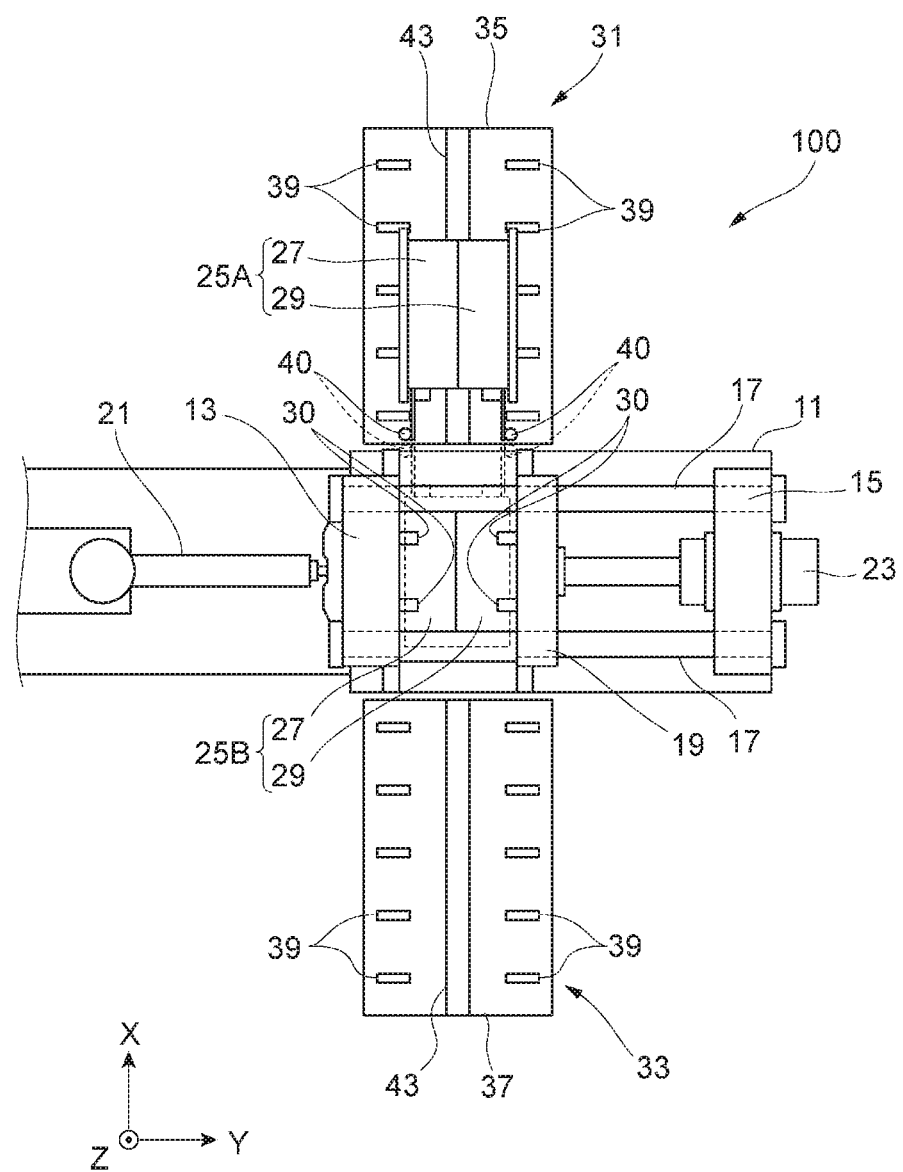
FIG. 4D is a process explanatory diagram illustrating a procedure of replacing the mold in the horizontal injection molding machine.

Then, as shown in FIG. 4D, the mold 25B is fixed to the fixed platen 13 and the movable platen 19, and the fixed mold 27 and the movable mold 29 are fixed by the clamp 30. Accordingly, the mold 25B is accurately positioned and fixed at the mold fixing position in the mold fixing space Sa.

In this state, by operating the injection cylinder 21, the resin is injected into the mold 25B so as to perform injection molding. The mold 25B into which the resin has been injected is released from the mold clamping and fixation, and is then conveyed out of the mold fixing space Sa to the second mold replacing device 33.

In this way, the injection molding machine 100 alternately conveys the molds 25A and 25B from the first mold replacing device 31 and the second mold replacing device 33 into and out of the mold fixing space Sa, so as to repeatedly perform the injection molding.

(Operation of Mold Conveying Guide Device)

Next, the operation of the mold conveying guide device 40 in the above mold replacement will be described in detail.

Figure 5:
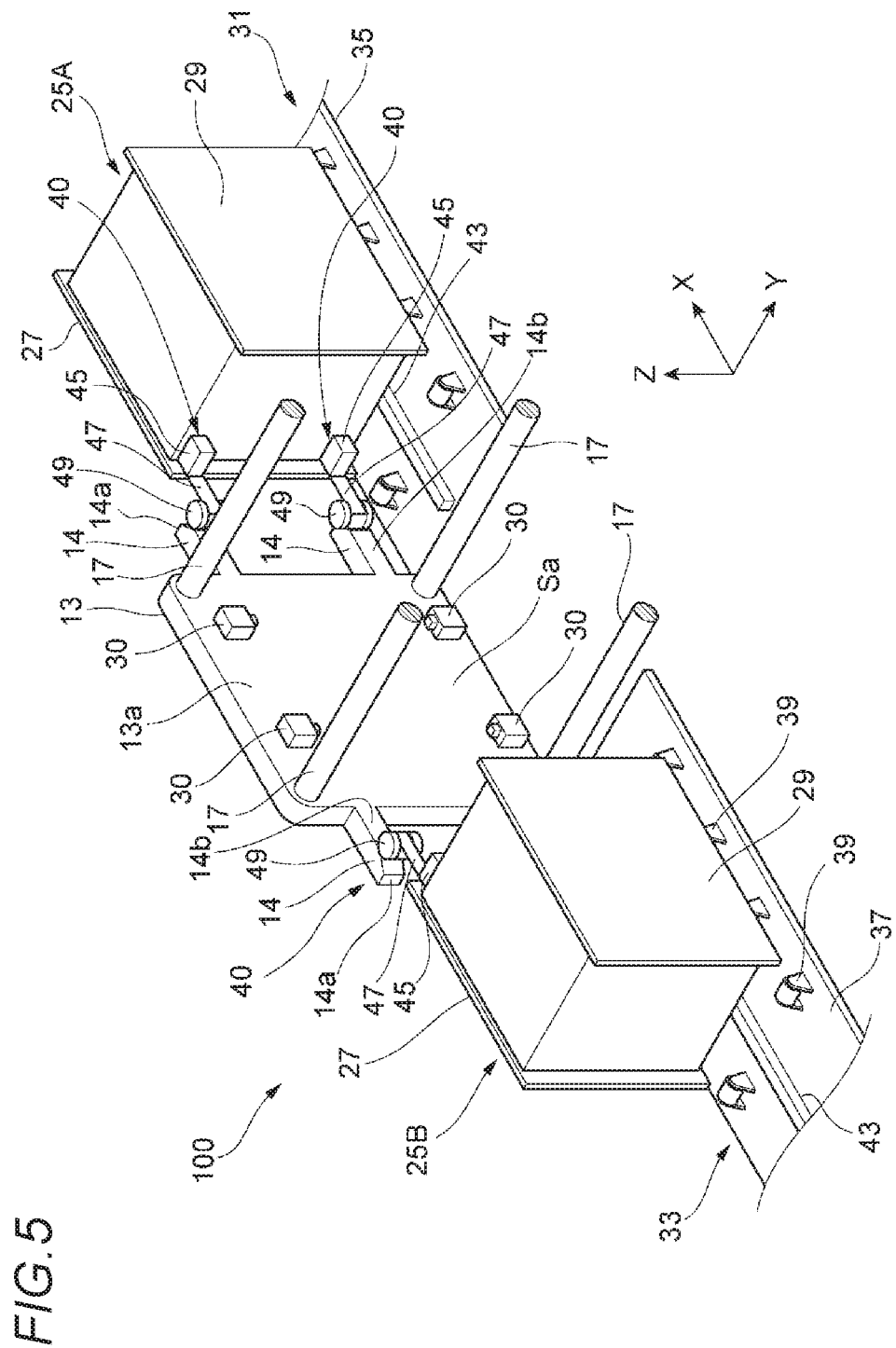
FIG. 5 is a perspective view of main parts for explaining a mold replacing operation of the horizontal injection molding machine.
Figure 6:
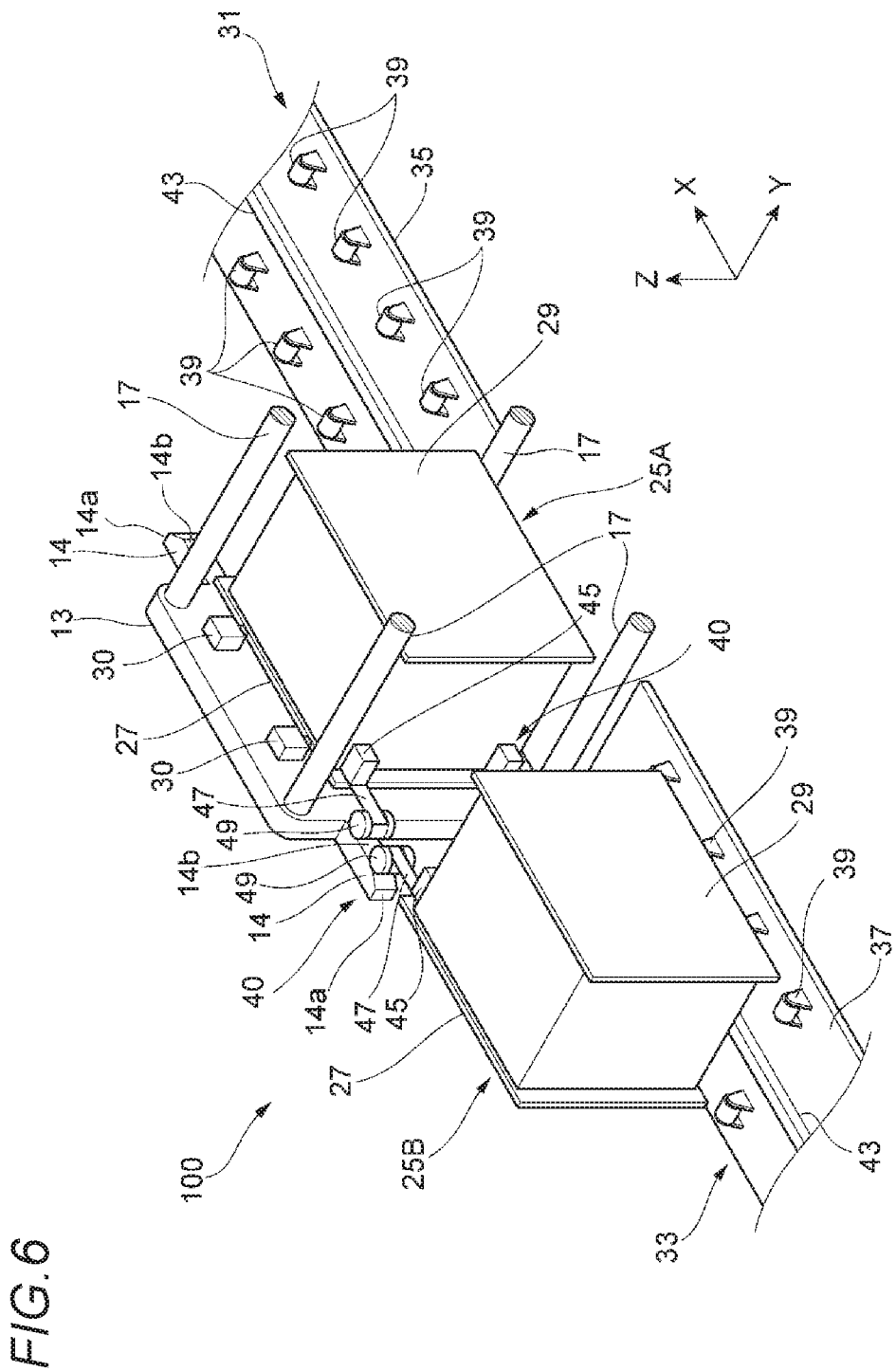
FIG. 6 is a perspective view of main parts for explaining the mold replacing operation of the horizontal injection molding machine.

FIG. 5 and FIG. 6 show schematic perspective views of main parts for explaining the mold replacing operation of the horizontal injection molding machine. FIG. 5 shows a state where the molds 25A and 25B are placed on the first mold replacing device 31 and the second mold replacing device 33, respectively. FIG. 6 shows a state where the mold 25A is conveyed into the mold fixing space Sa. In FIG. 5 and FIG. 6, the mold conveying guide device on a movable platen 19 (see FIG. 2) side is omitted.

When conveying the mold 25A from the first mold replacing device 31 to the mold fixing space Sa, the guide roller 49 in the mold conveying guide device 40 provided on an end surface of the mold 25A on a mold fixing space Sa side first comes into contact with the pair of upper and lower guide pieces 14A and 14B provided on the fixed platen 13 (and the movable platen 19 not shown).

The guide pieces 14A and 14B are each formed with a tapered surface 14a which is thinner at a protruding tip end portion. An inner side surface 14b of the guide pieces 14A and 14B following the tapered surface 14a is in the same plane as the mold attaching surface 13a of the fixed platen 13. That is, the inner side surface 14b of the guide pieces 14A and 14B is flush with the mold attaching surface 13a of the fixed platen 13, so that the guide roller 49 can move smoothly.

Although not shown, similarly the guide piece of the movable platen 19 also has a tapered surface and an inner surface. Therefore, the guide roller of the mold conveying guide device on the movable platen 19 side can smoothly move from the tapered surface to the mold attaching surface 19a (see FIG. 1) of the movable platen 19.

When the mold 25A moves toward the mold fixing space Sa, the guide roller 49 is guided in contact with the tapered surface 14a of the guide pieces 14A and 14B, and then moves while rotating along the mold attaching surface 13a of the fixed platen 13. That is, a sudden contact (collision) between the guide roller 49 and the fixed platen 13 is prevented by providing the tapered surface 14a.

Figure 7A:
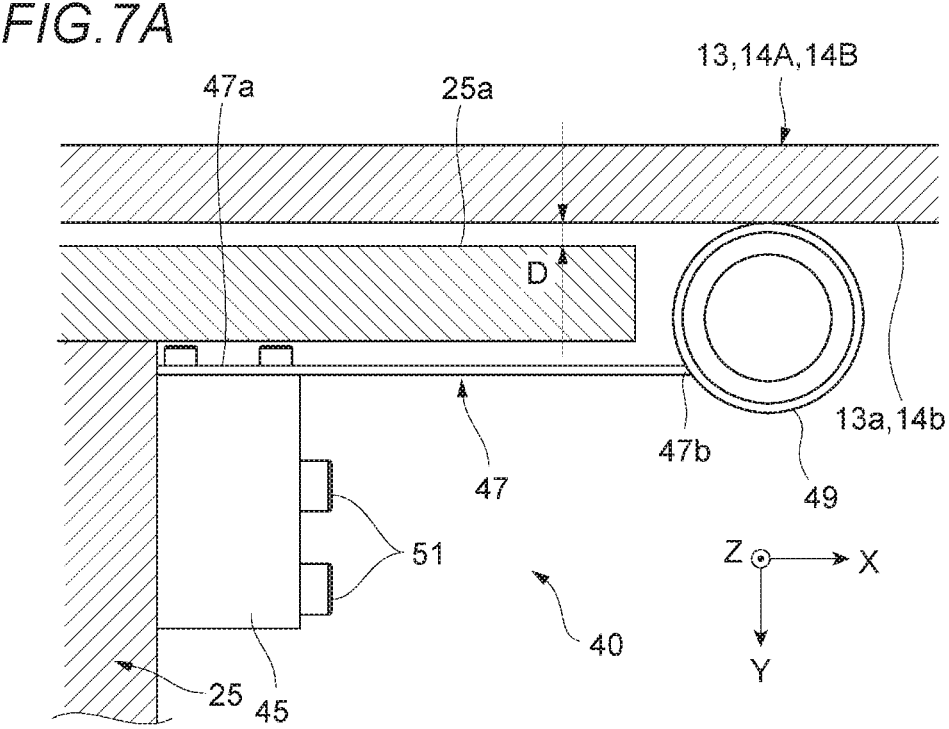
FIG. 7A and FIG. 7B are operation explanatory diagrams of the mold conveying guide device shown in FIG. 5 and FIG. 6.
Figure 7B:
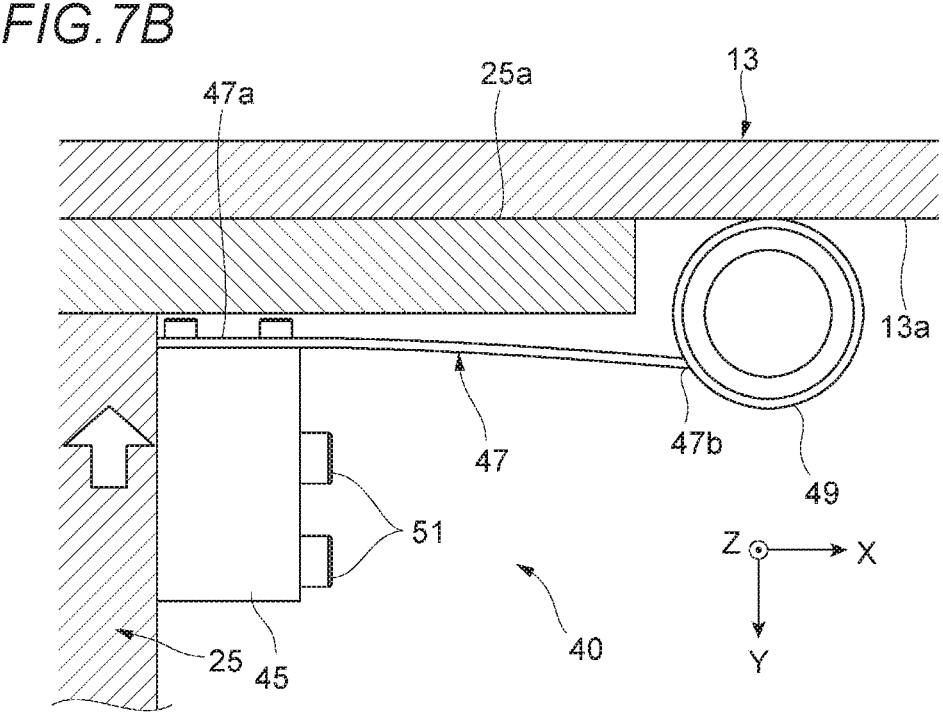

FIG. 7A and FIG. 7B are operation explanatory diagrams of the mold conveying guide device shown in FIG. 5 and FIG. 6. As shown in FIG. 7A, while the mold 25A moves toward the mold fixing space Sa, a part of the guide roller 49 protrudes from an outermost surface 25a of the mold 25A by a distance D in the Y direction. Therefore, when conveying the mold 25A into the mold fixing position, the guide roller 49 rotates while pressing the mold attaching surface 13a of the fixed platen 13. Accordingly, the outermost surface 25a of the mold 25A is separated from the mold attaching surface 13a and the inner surfaces 14b of the guide pieces 14A and 14B, thereby preventing mutual contact. Therefore, wear or damage due to contact between the mold 25A and the fixed platen 13 does not occur.

On the other hand, as shown in FIG. 7B, when conveying the mold 25A into the mold fixing space Sa and clamping the same, the mold 25A is pressed against the fixed platen 13. At this time, the guide roller 49 in contact with the mold attaching surface 13a is not protruded from the outermost surface 25a of the mold 25A due to the elastic deformation of the connecting arm 47, so that the outermost surface 25a and the mold attaching surface 13a are in close contact with each other.

FIG. 7A and FIG. 7B show a state where the guide roller 49 is in contact with the fixed platen 13, and the same applies to a case where the guide roller 49 is in contact with the movable platen 19. That is, the mold 25A is separated from the mold attaching surfaces 13a and 19a of the fixed platen 13 and the movable platen 19 during the movement of the mold 25A, and the mold 25A comes into close contact with the fixed platen 13 and the movable platen 19 during mold clamping.

In this configuration, since the mold conveying guide device 40 is provided in both the fixed mold 27 and the movable mold 29 of the mold 25A, the mold 25A can be smoothly guided without being brought into contact with either the fixed platen 13 or the movable platen 19 when conveying the mold 25A into the mold fixing space Sa. In addition, since a pair of upper and lower mold conveying guide devices 40 is provided on the mold 25A, it is possible to prevent posture changes such as inclination of the mold 25A when conveying the mold 25A, and more stable conveyance can be achieved.

Further, even when the mold conveying guide device 40 is provided in only one of the fixed mold 27 and the movable mold 29 of the mold 25A, the contact between the mold 25A and the fixed platen 13 and the contact between the mold 25A and the movable platen 19 can be prevented during the mold conveyance, by adjusting a size of a mold opening.

The case of conveying the mold 25A into the mold fixing space Sa is described above, and the same applies to a case of conveying the mold 25B into the mold fixing space Sa. The mold 25B during the mold conveyance can be reliably separated from the mold attaching surfaces 13a and 19a of the fixed platen 13 and the movable platen 19.

In this way, according to the injection molding machine 100 of the present embodiment, when conveying the molds 25A and 25B into the mold fixing position, the guide roller 49 of the mold conveying guide device 40 rotates while pressing at least one of the mold attaching surfaces 13a and 19a of the fixed platen 13 and the movable platen 19. Accordingly, the mold 25 can be held at a position separated from the mold attaching surfaces 13a and 19a by the resilient force of the connecting arm 47. Therefore, during the movement of the mold 25A, the contact between the mold 25A and the fixed platen 13 and the contact between the mold 25 and the movable platen 19 can be reliably prevented, and replacement of the mold at a high speed can be performed without causing damage to the mold 25 and the injection molding machine 100.

In addition, when clamping the mold 25A with the fixed platen 13 and the movable platen 19, since the connecting arm 47 is elastically deformed and the guide roller 49 retracts to the mold 25A side, the mold can be clamped smoothly and reliably without obstructing the approaching action between the mold 25A and the mold attaching surfaces 13a and 19a.

Because of having a simple configuration including the connecting arm 47 and the guide roller 49, the mold conveying guide device 40 according to the present embodiment can be easily installed on the mold 25 at a low cost. Therefore, when the mold conveying guide device 40 of this configuration is adopted, the injection molding machine 100 capable of preventing damage to the mold 25 and the injection molding machine 100 and of replacing the mold at a high speed without restrictions on the mold clamping strength or mold dimensions is realized at a low cost.

When the mold conveying guide device 40 is provided in the horizontal injection molding machine 100, the mold conveying roller 39 supports the weight of the molds 25A and 25B, so that the resilient force of the mold conveying guide device 40 can be reduced as compared with a case where the mold conveying guide device 40 is provided in a vertical mold injection molding machine. Therefore, the mold conveying guide device 40 can be configured in a compact and low-cost configuration.

Second Embodiment

Next, a second embodiment of the present disclosure will be described. In the following description, components which are the same as or functionally common to those of the first embodiment are denoted by the same reference numerals, and the description thereof is omitted as appropriate.

Figure 8A:
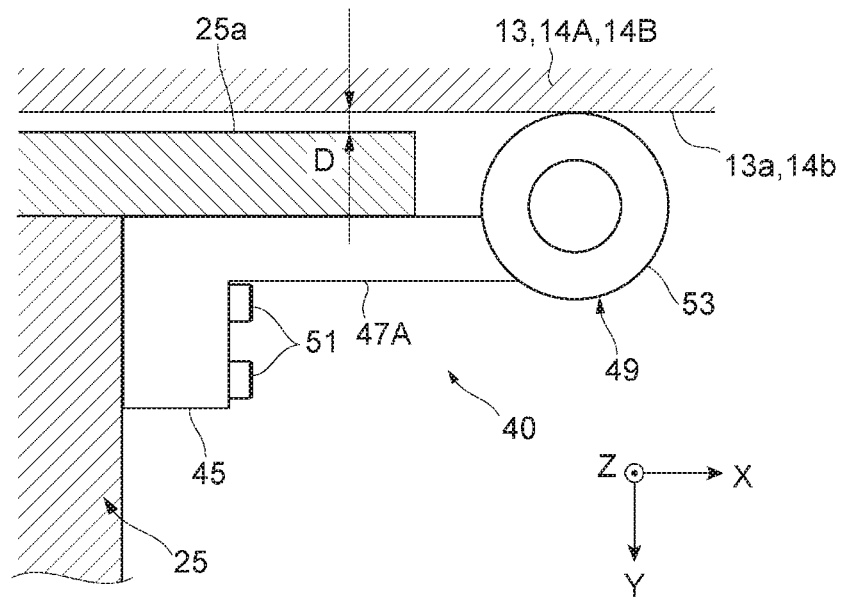
FIG. 8A and FIG. 8B are configuration and operation explanatory diagrams of a mold conveying guide device according to a second embodiment.
Figure 8B:
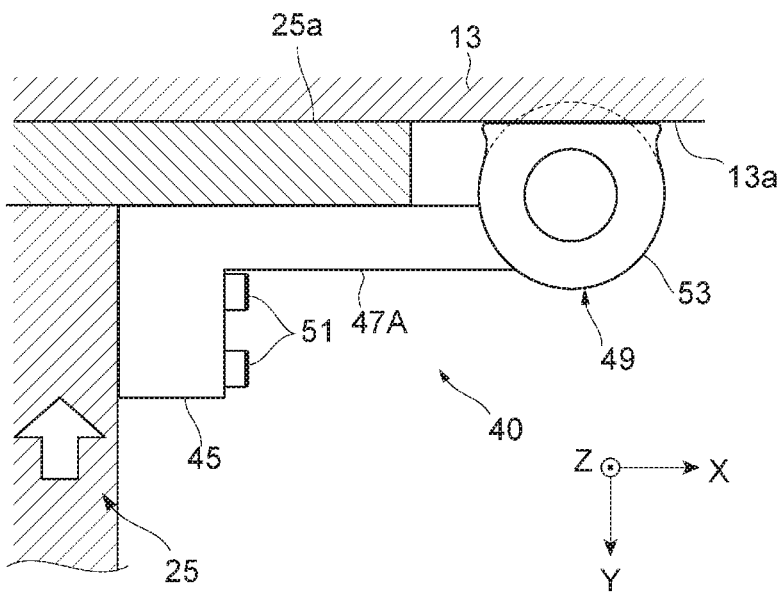

FIG. 8A and FIG. 8B are configuration and operation explanatory diagrams of the mold conveying guide device according to 40 to a second embodiment.

A connecting arm 47A of the mold conveying guide device 40 of the present embodiment is a rigid body integrally formed with the fixing portion 45. The guide roller 49 formed of a flexible elastic body 53 such as rubber is rotatably supported at a tip end portion of the connecting arm 47A.

As shown in FIG. 8A, during the movement of the mold 25, the guide roller 49 rotates while being in contact with the inner surface 14b of the guide pieces 14A and 14B and the mold attaching surface 13a of the fixed platen 13. Accordingly, while the mold 25 is moved, the outermost surface 25a of the mold 25 and the mold attaching surface 13a are separated from each other by the distance D, thereby preventing mutual contact.

On the other hand, when conveying the mold 25 into the mold fixing space Sa and clamping the same, the guide roller 49 formed of the elastic body 53 is elastically deformed and crushed in a radial direction, and the outermost surface 25a of the mold 25 is pressed against the mold attaching surface 13a, as shown in FIG. 8B. In addition, the guide roller 49 is elastically returned to the original roller shape after the mold clamping is completed.

According to this configuration, during the movement of the mold 25, the mold 25 can be separated from the mold attaching surfaces 13a and 19a by the guide roller 49, and damage to the mold and the injection molding machine can be reliably prevented.

Third Embodiment

Next, a third embodiment of the present disclosure will be described.

Figure 9:
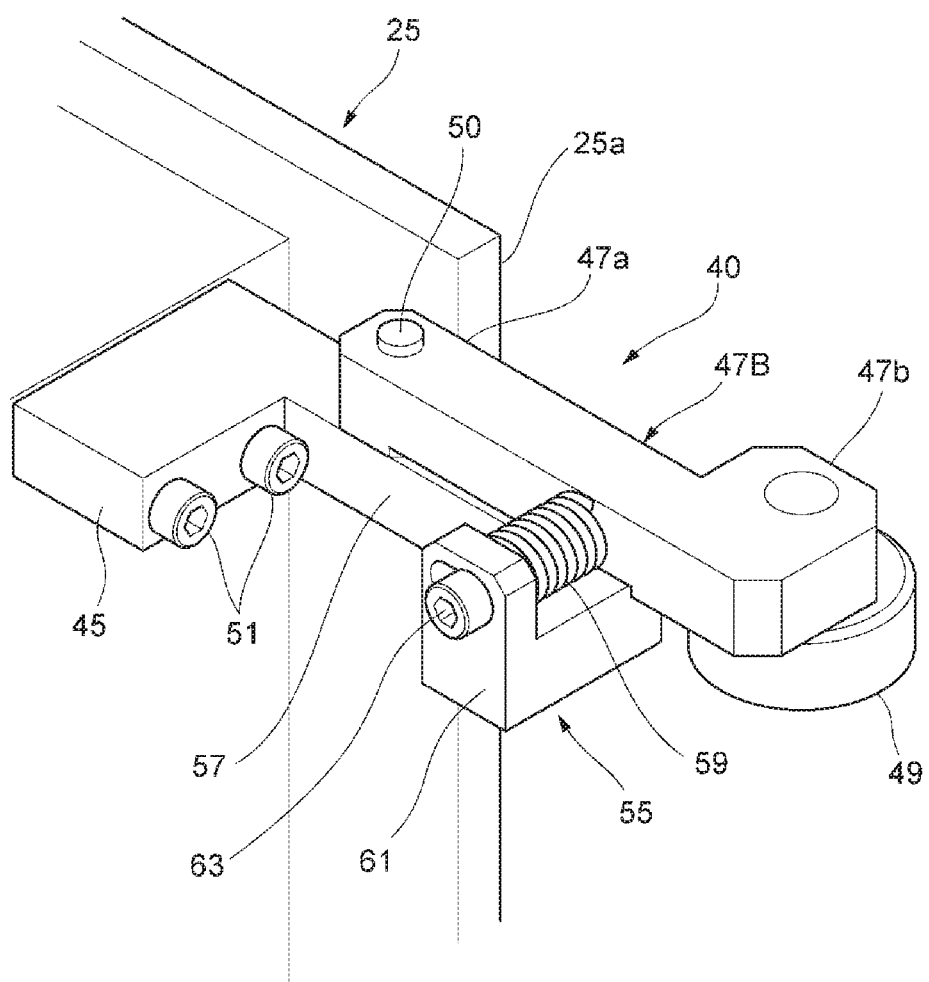
FIG. 9 is a perspective view of a mold conveying guide device according to a third embodiment.

FIG. 9 is a perspective view of a mold conveying guide device according to a third embodiment.

The mold conveying guide device 40 according to the present embodiment includes: a connecting arm 47B; the guide roller 49 rotatably supported by a tip end portion 47b of the connecting arm 47B; and an elastic urging mechanism 55 provided between the connecting arm 47B and the mold 25, configured to support a base end portion 47a of the connecting arm 47B so as to be swingable about a swing shaft 50 and configured to elastically urge the connecting arm 47B to one side in a swinging direction.

The elastic urging mechanism 55 includes the fixing portion 45 fixed to the mold 25, an arm portion 57 formed extending from the fixing portion 45, and a spring support portion 61 provided at a tip of the arm portion 57 and configured to support a spring material 59 that urges the connecting arm 47B. A preload of the spring material 59 can be adjusted by tightening a bolt 63.

The swing shaft 50 on which the connecting arm 47B is supported is provided in the middle of the extension of the arm portion 57, and the guide roller 49 can be protruded and retracted from the outermost surface 25a of the mold 25 by the swinging operation of the connecting arm 47B.

Figure 10A:
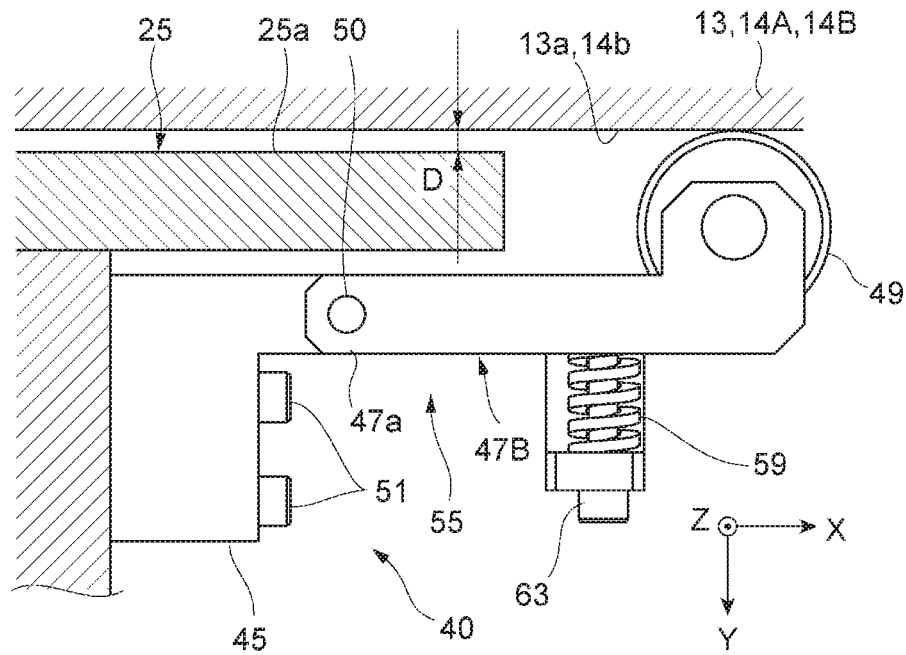
FIG. 10A and FIG. 10B are operation explanatory diagrams of the mold conveying guide device shown in FIG. 9.
Figure 10B:
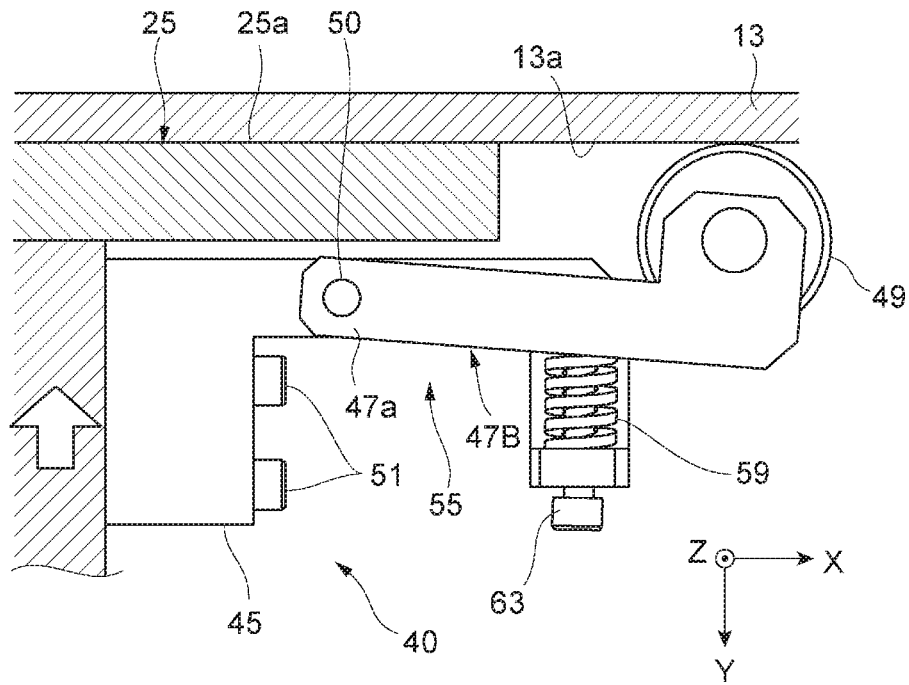

FIG. 10A and FIG. 10B are operation explanatory diagrams of the mold conveying guide device 40 shown in FIG. 9. As shown in FIG. 10A, during the movement of the mold 25, the guide roller 49 rotates while being in contact with the inner surface 14b of the guide pieces 14A and 14B and the mold attaching surface 13a of the fixed platen 13. Accordingly, while the mold 25 is moved, the outermost surface 25a of the mold 25 and the mold attaching surface 13a are separated from each other by the distance D, thereby preventing mutual contact.

On the other hand, when conveying the mold into the mold fixing space Sa and clamping the same, the mold 25 is pressed against the fixed platen 13, as shown in FIG. 10B. At this time, the connecting arm 47B swings about the swing shaft 50 while pressing the spring material 59, and the guide roller 49 in contact with the mold attaching surface 13a is pushed downward in FIG. 10B. Accordingly, the connecting arm 47B is inclined, and the outermost surface 25a of the mold 25 is in close contact with the mold attaching surface 13a of the fixed platen 13.

In this way, according to the present embodiment, the mold 25 can be separated from the mold attaching surfaces 13a and 19a by the resilient force of the spring material 59. In addition, by adjusting the preload of the spring material 59 with the bolt 63, the mold 25 and the mold attaching surfaces 13a and 19a can be separated with a more appropriate force.

Fourth Embodiment

Next, a fourth embodiment of the present disclosure will be described.

Figure 11:
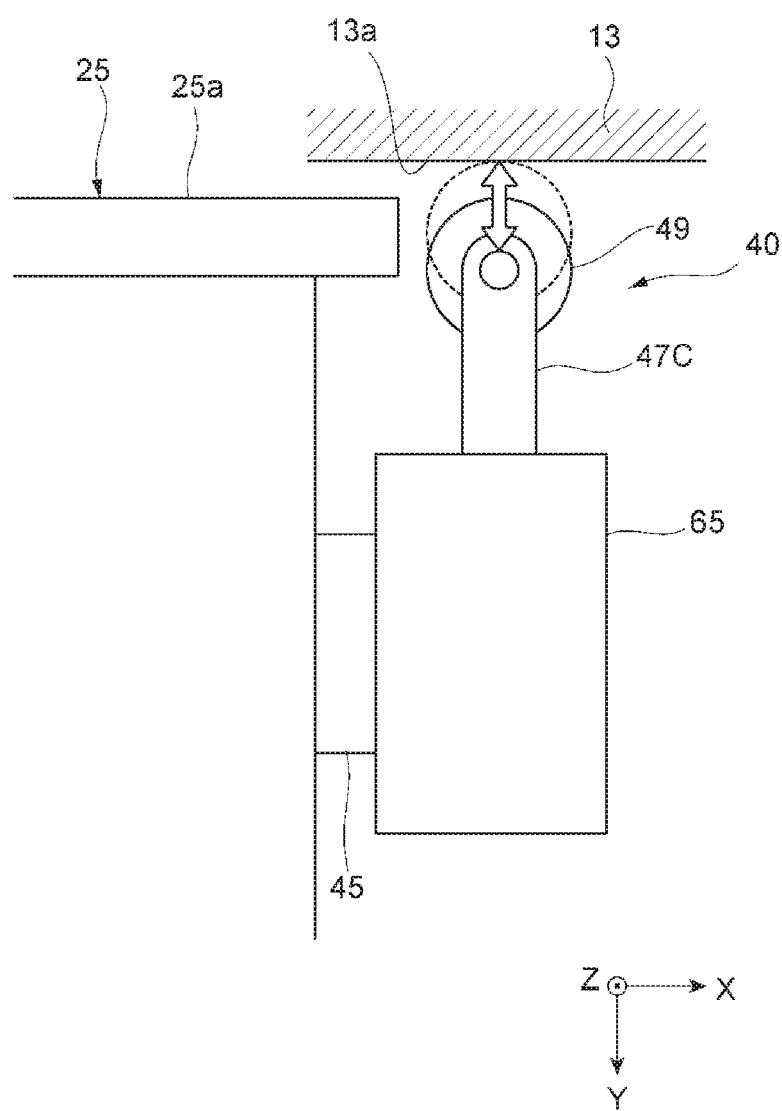
FIG. 11 is a plan view of main parts of a mold conveying guide device according to a fourth embodiment.

FIG. 11 is a plan view of main parts of a mold conveying guide device according to the fourth embodiment.

The mold conveying guide device 40 according to the present embodiment includes a connecting arm 47C, the guide roller 49, and an actuator 65 provided between the connecting arm 47C and the mold 25 and driven by pneumatic pressure, hydraulic pressure or electricity.

The actuator 65 is attached to the mold 25 via the fixing portion 45. The connecting arm 47C can move forward and backward by driving the actuator 65, and moves the guide roller 49 forward and backward in a direction (Y direction) orthogonal to the conveying direction (X direction) of the mold 25.

According to this configuration, the connecting arm 47C is urged toward the mold attaching surface 13a, 19a side by driving the actuator 65, so that the mold attaching surfaces 13a and 19a are pressed by the guide roller 49. Due to the reaction force, the mold 25 is separated from the mold attaching surfaces 13a and 19a. In this way, even when the mold conveying guide device 40 according to the present embodiment is not provided with an elastic member, the effect similar to that of the first embodiment is acquired.

Further, since the mold conveying guide device 40 according to the present embodiment can stop driving the actuator 65 when clamping the mold 25, so as to release the pressing force in a direction of separating the mold 25 from the mold attaching surfaces 13a and 19a, the clamping force imparted to the mold by the mold clamping mechanism 23 shown in FIG. 1 can be entirely applied to the mold 25.

In addition, the actuator 65 in the present embodiment is not limited to the configuration shown in FIG. 11. For example, use may also be made of a configuration in which an actuator is provided instead of the spring material 59 of the elastic urging mechanism 55 in the third embodiment. In this case, by stopping the operation of the actuator when clamping the mold 25, the mold clamping force of the mold clamping mechanism 23 can be applied to the mold 25 efficiently.

The present disclosure is not limited to the above embodiments, and combinations of the respective configurations of the embodiments, or changes and applications made by those skilled in the art based on the description of the specification and the well-known technology are also intended by the present disclosure and are included within the scope to be protected.

In addition to providing a plurality of mold conveying guide devices 40 at the end portion on the front side of the fixed mold 27 and the movable mold 29, which forming the mold 25, in the direction in which the mold 25 is conveyed, the mold conveying guide devices 40 may only be provided at the fixed mold 27 or the movable mold 29, or may be provided at only one place for each mold.

In addition to being applied to the horizontal injection molding machine 100, the mold conveying guide device 40 of each embodiment described above may also be applied to a vertical injection molding machine.

As described above, the present description discloses the following configurations.

(1) A mold conveying guide device for use in replacement of a mold by conveying the mold into and out of a mold fixing position in an injection molding machine which is configured to sandwich the mold conveyed into the mold fixing position between a fixed platen and a movable platen to injection-mold a molded product, the mold conveying guide device including:

a connecting arm attached to the molds and projecting in a direction in which the mold is conveyed into the mold fixing position; and a guide roller rotatably supported at a tip end portion of the connecting arm, configured to rotate while being in contact with a mold attaching surface of at least one of the fixed platen and the movable platen, and configured to guide the mold such that the mold can come close to or move away from the at least one of the fixed platen and the movable platen.

With this configuration, the mold can be installed easily at a low cost, restrictions on strength or mold dimensions of the injection molding machine are not caused, the mold can be separated from the mold attaching surface to prevent the damage to the mold and the injection molding machine when conveying the mold into the mold fixing position and the mold can be replaced at a high speed.

(2) The mold conveying guide device according to (1), wherein when conveying the mold into the mold fixing position, the guide roller presses the mold attaching surface of the at least one of the fixed platen and the movable platen to separate the mold from the mold attaching surface, and when clamping the mold, the guide roller is elastically displaced on the mold attaching surface to bring the mold into close contact with the mold attaching surface.

With this configuration, when conveying the mold into the mold fixing position, the mold can be separated from the mold attaching surface, and when clamping the mold, the mold can be brought into close contact with the mold attaching surface.

(3) The mold conveying guide device according to (1) or (2), wherein the connecting arm is an elastic body configured to elastically urge the guide roller to the mold attaching surface.

With this configuration, due to the elastic deformation of the connecting arm, the mold can be separated from the mold attaching surface and brought into close contact therewith.

(4) The mold conveying guide device according to (1) or (2), wherein the guide roller is made of an elastic body configured to contract in a radial direction due to elastic deformation to bring the mold into close contact with the mold attaching surface.

With this configuration, due to the elastic deformation of the guide roller, the mold can be separated from the mold attaching surface and brought into close contact therewith.

(5) The mold conveying guide device according to (1) or (2), wherein an elastic urging mechanism configured to urge the mold in a direction away from the mold attaching surface is provided between the connecting arm and the mold.

With this configuration, when conveying the mold into the mold fixing position, the mold can be separated from the mold attaching surface by a resilient force of the elastic urging mechanism provided between the connecting arm and the mold.

(6) The mold conveying guide device according to (1) or (2), wherein an actuator configured to be driven by pneumatic pressure, hydraulic pressure or electricity is provided between the connecting arm and the mold, and the mold is pressed, by driving the actuator, in a direction away from the mold attaching surface.

With this configuration, when conveying the mold into the mold fixing position, the mold can be separated from the mold attaching surface by driving the actuator.

(7) An injection molding machine which is configured to sandwich a mold conveyed into a mold fixing position between a fixed platen and a movable platen to injection-mold a molded product, the injection molding machine including:

a plurality of molds;

a plurality of mold conveying guide devices each of which is the mold conveying guide device according to any one of (1) to (6), the plurality of mold conveying guide device provided on the plurality of molds, respectively;

a mold conveying mechanism configured to convey the molds into and out of the mold fixing position; and a mold clamping mechanism configured to clamp mold by pressing the movable platen against the fixed platen with the mold interposed therebetween.

With this configuration, the damage to the mold and the molding machine is prevented and the mold can be replaced at a high speed, so that injection molding can be performed with high accuracy.

What is claimed is:

1. A mold conveying guide device for use in replacement of a mold by conveying the mold into and out of a mold fixing position in an injection molding machine which is configured to sandwich the mold conveyed into the mold fixing position between a fixed platen and a movable platen to injection-mold a molded product, the mold conveying guide device comprising:

a connecting arm attached to the mold and projecting in a direction in which the mold is conveyed into the mold fixing position; and a guide roller rotatably supported at a tip end portion of the connecting arm, configured to rotate while being in contact with a mold attaching surface of at least one of the fixed platen and the movable platen, and configured to guide the mold such that the mold can come close to or move away from the at least one of the fixed platen and the movable platen.

2. The mold conveying guide device according to claim 1, wherein when conveying the mold into the mold fixing position, the guide roller presses the mold attaching surface of the at least one of the fixed platen and the movable platen to separate the mold from the mold attaching surface, and wherein when clamping the mold, the guide roller is elastically displaced on the mold attaching surface to bring the mold into close contact with the mold attaching surface.

3. The mold conveying guide device according to claim 1, wherein the connecting arm is an elastic body configured to elastically urge the guide roller to the mold attaching surface.

4. The mold conveying guide device according to claim 1, wherein the guide roller is made of an elastic body configured to contract in a radial direction due to elastic deformation to bring the mold into close contact with the mold attaching surface.

5. The mold conveying guide device according to claim 1, wherein an elastic urging mechanism configured to urge the mold in a direction away from the mold attaching surface is provided between the connecting arm and the mold.

6. The mold conveying guide device according to claim 1,
wherein an actuator configured to be driven by pneumatic pressure, hydraulic pressure or electricity is provided between the connecting arm and the mold, and
wherein the mold is pressed, by driving the actuator, in a direction away from the mold attaching surface.

7. An injection molding machine which is configured to sandwich a mold conveyed into a mold fixing position between a fixed platen and a movable platen to injection-mold a molded product, the injection molding machine comprising:
a plurality of molds;
a plurality of mold conveying guide devices each of which is the mold conveying guide device according to claim 1, the plurality of mold conveying guide devices provided on the plurality of molds, respectively;
a mold conveying mechanism configured to convey the molds into and out of the mold fixing position; and
a mold clamping mechanism configured to clamp the mold by pressing the movable platen against the fixed platen with the mold interposed therebetween.

\* \* \* \* \*